No. 864,097. PATENTED AUG. 20, 1907.
F. KIEFEL.
JOURNAL BEARING.
APPLICATION FILED OCT. 23, 1903.

Witnesses
Earle R. Passol
Agnes B. Grant

Inventor
Frank Kiefel

By Attorneys
Parkinson + Richards

UNITED STATES PATENT OFFICE.

FRANK KIEFEL, OF CINCINNATI, OHIO, ASSIGNOR OF ONE-HALF TO ALBERT J. HAUSER, OF CINCINNATI, OHIO.

JOURNAL-BEARING.

No. 864,097.   Specification of Letters Patent.   Patented Aug. 20, 1907.

Application filed October 23, 1903. Serial No. 178,176.

*To all whom it may concern:*

Be it known that I, FRANK KIEFEL, a citizen of the United States, residing at Cincinnati, in the county of Hamilton and State of Ohio, have invented certain new and useful Improvements in Journal-Bearings, of which the following is a specification.

The object of my invention is to provide an improved journal bearing for shafts and my invention consists in the combination and arrangement of parts hereinafter described and claimed.

Figure 1:
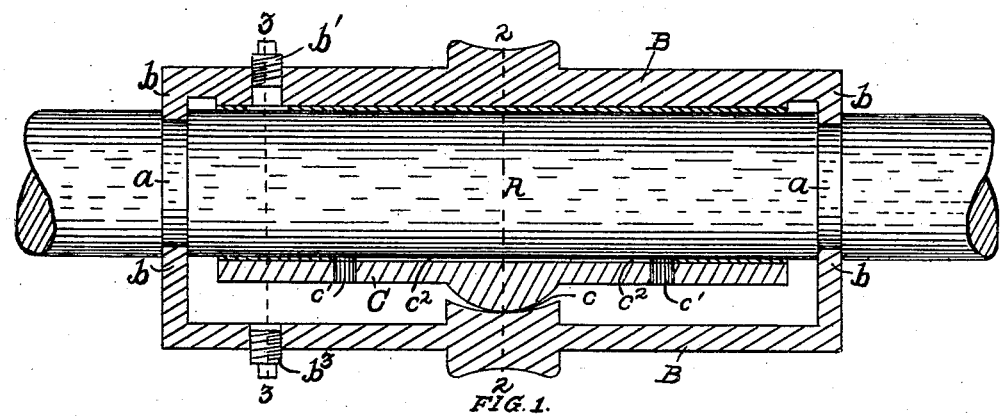
Figure 2:
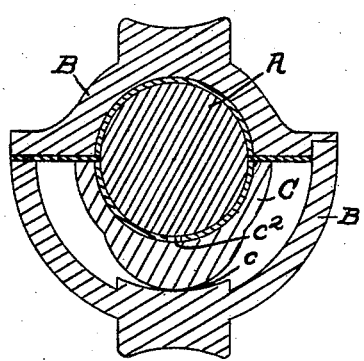
Figure 3:
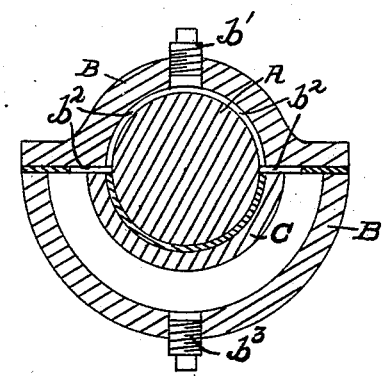

In the drawings Figure 1, is a longitudinal section of a journal box embodying my invention; and Figs. 2 and 3, sections on line 2—2 and 3—3 respectively of Fig. 1.

Reference letter A denotes the shaft; B, the journal box; and C, a bearing in box B.

The shaft A is provided with annular grooves $a$ into which the ends $b$ of box B fit. Bearing C is mounted in box B in a ball and socket bearing $c$, thus rendering the bearing C flexible to adjust itself to any slight disalinement of shaft A. At $b'$ the box B is provided with a tap screw for the admission of oil and with a channel $b^2$ to conduct the oil to the lower portion of the box. A tap screw $b^3$ is also provided for draining box B when desired. Bearing C is provided with holes $c'$ and a groove $c^2$ for applying oil to shaft A.

In operation box B is filled with oil up to the level of the bottom of the opening in the ends of the box, or in other words until the oil flows or is about to flow from the end openings of the box. At this level of oil, the lower portion of shaft lies below the level of oil to the extent of the depth of grooves $a$. Consequently oil flows up through holes $c'$ into grooves $c^2$ to keep the surface of shaft A constantly oiled, by what amounts in effect to an actual submersion of the lower portion of the shaft in a bath of oil. Thus the shaft is practically flooded with oil and the oil used over and over again without waste.

It will be noted that the engagement of the grooves $a$ with the ends $b$ of box B serves to prevent longitudinal movement of the shaft, thus obviating the use of collars and also serves to exclude dust from the bearing.

In some cases, where flexibility is not required, the bearing C may be made rigid in box B with good results.

It is obvious that this bearing may be used for mounting shafts or axles in any form of machinery as well as for mounting line shafts.

I claim as my invention:

1. A journal box in combination with a shaft bearing C loosely mounted therein on a single ball bearing $c$, whereby the bearing C is rendered flexible to adjust itself to the shaft in any direction independently of the box, substantially as specified.

2. In a journal bearing, the combination of a shaft having annular grooves therein; a journal box formed in two parts and provided with closed ends engaging the grooves, and a substantially semi-cylindrical bearing inclosed in the box and mounted in a single ball bearing therein, whereby the bearing is rendered flexible to adjust itself to the shaft in any direction, substantially as specified.

3. The combination of a shaft having grooves $a$, box B formed in two parts having closed ends $b$ engaging grooves $b$; bearing C inclosed in box B and provided with ball bearing $c$, there being openings $c'$ and groove $c^2$ for supplying oil to the shaft, substantially as specified.

FRANK KIEFEL.

Witnesses:
ALBERT J. HAUSER,
BRAYTON G. RICHARDS.